US007617296B2

(12) United States Patent
Bank (10) Patent No.: US 7,617,296 B2
(45) Date of Patent: Nov. 10, 2009

(54) DATA COMPILATION SYSTEM AND METHOD

(75) Inventor: Bryna L. Bank, San Francisco, CA (US)

(73) Assignee: RealNetworks, Inc., Seattle, WA (US)

( * ) Notice: Subject to any disclaimer, the term of this patent is extended or adjusted under 35 U.S.C. 154(b) by 755 days.

(21) Appl. No.: 11/112,021

(22) Filed: Apr. 22, 2005

(65) Prior Publication Data

US 2006/0241955 A1 Oct. 26, 2006

(51) Int. Cl.
*G06F 15/173* (2006.01)
(52) U.S. Cl. .................................. 709/217; 707/102
(58) Field of Classification Search ................. 709/217; 707/102
See application file for complete search history.

(56) References Cited

U.S. PATENT DOCUMENTS 5,583,763 A * 12/1996 Atcheson et al. ............... 707/3
6,151,634 A * 11/2000 Glaser et al. ................ 709/236
7,080,139 B1 * 7/2006 Briggs et al. ................ 709/224
7,111,037 B1 * 9/2006 Chesley et al. .............. 709/203
7,234,117 B2 * 6/2007 Zaner et al. ................. 715/758
7,302,488 B2 * 11/2007 Mathew et al. .............. 709/229
7,326,117 B1 * 2/2008 Best ............................ 463/32
7,353,034 B2 * 4/2008 Haney ...................... 455/457
7,373,635 B2 * 5/2008 Guyette ..................... 717/120
7,383,308 B1 * 6/2008 Groves et al. .............. 709/206
7,386,798 B1 * 6/2008 Heikes et al. ............... 715/752
7,412,527 B2 * 8/2008 Pulver et al. ............... 709/229

* cited by examiner

*Primary Examiner*—David Y Eng
(74) *Attorney, Agent, or Firm*—Holland & Knight LLP; Brian J Colandreo, Esq.; Mark H. Whittenberger (57) ABSTRACT

A method, computer program product, client, and server application configured to store information associated with a subset of users of a media distribution service in a memory. At least one distribution history data set is compiled for each member of the subset of users. The at least one distribution history data set for each member of the subset of users are combined to form a combined distribution history data set. Information from the combined distribution history data set is transferred to a user electronic device.

46 Claims, 10 Drawing Sheets

DATA COMPILATION SYSTEM AND METHOD

TECHNICAL FIELD

This disclosure relates to data compilation and, more particularly, to data compilation concerning the musical preferences of a selected group of users.

BACKGROUND

Media distribution services (e.g., the RealRhapsody service offered by RealNetworks of Seattle, Wash.) distribute media to users from a media server. A media distribution service may distribute media by allowing a user to receive downloaded files and/or receive streamed files and audio tracks. Streaming is a technique of transferring data such that the data is processed as a steady and continuous stream of information. When streaming data, the client-side browser can start processing the data before the entire file is transmitted, as generally described in U.S. Pat. No. 6,151,634. The media streamed may include audio and/or video information, such as the streaming of music, radio broadcasts, movies, television/cable broadcasts, and sporting events, for example.

Often, a media distribution service may provide its' users with summaries (e.g., tables) that define the consolidated preferences of all of its' users. For example, if the media distribution service streams music to 1,000,000 subscribers, summaries may be available to the users that summarize e.g., the top 100 tracks streamed (to the 1,000,000 users), the top 100 artists streamed (to the 1,000,000 users), and the top 100 titles streamed (to the 1,000,000 users), as generally described in U.S. Pat. No. 5,583,763.

Unfortunately, as these summaries define the consolidated preferences of the entire user base, the value of these summaries is questionable, as the tastes and preferences of the entire user base would typically be quite divergent. For example, a classical music fan is probably not interested in what a rock-n-roll fan considers to be their favorite album.

DETAILED DESCRIPTION OF THE PREFERRED EMBODIMENTS

Figure 1:
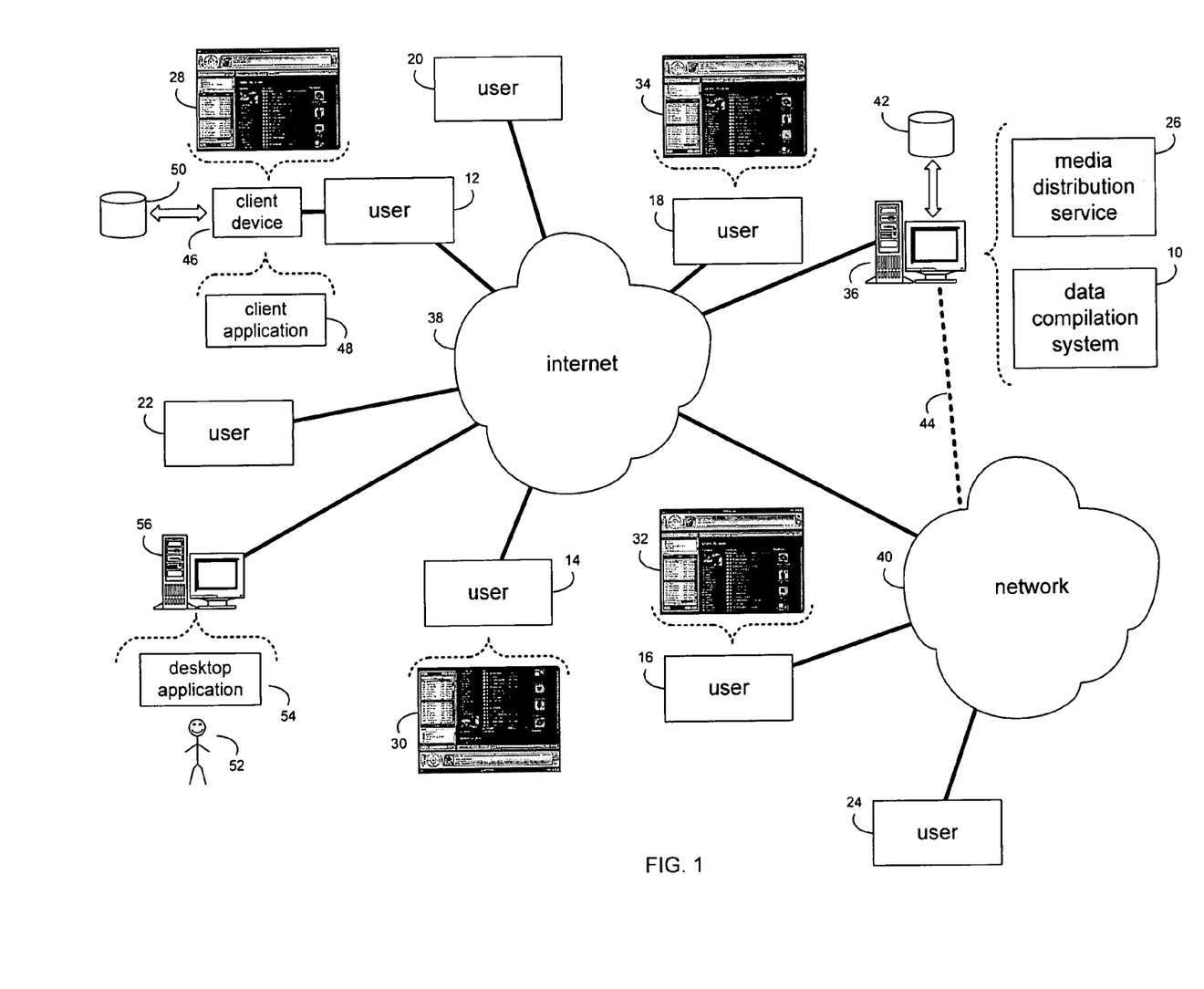
FIG. 1 is a diagrammatic view of a data compilation system and a media distribution service coupled to a distributed computing network.

Referring to FIG. 1, there is shown a data compilation system 10 that allows a user (e.g., user 12) to define, via an electronic client device (to be discussed below in greater detail), a user subset having at least one member (e.g., users 14, 16, 18), chosen from a plurality of users (e.g., users 14, 16, 18, 20, 22, 24) of a media distribution service 26 (e.g., the Rhapsody™ service offered by RealNetworks™, Seattle, Wash.). User 12 may view a combined distribution history data set 28, which is a combination of a distribution history data set (e.g., data sets 30, 32, 34) for each member of the user subset (e.g., users 14, 16, 18) respectively.

Data compilation system 10 is typically a server application that resides on and is executed by a computer 36 (i.e., a server device) that is connected to network 38 (e.g., the Internet). Computer 36 may be a web server running a network operating system, such as Microsoft Windows 2000 Server™, Novell Netware™, or Redhat Linux™. Typically, computer 36 also executes a web server application, such as Microsoft IIS™, Novell Webserver™, or Apache Webserver™, that allows for HTTP (i.e., HyperText Transfer Protocol) access to computer 36 via network 38. Network 38 may be connected to one or more secondary networks (e.g., network 40), such as: a local area network; a wide area network; or an intranet, for example.

The instruction sets and subroutines of data compilation system 10, which are typically stored on a storage device 42 coupled to computer 36, are executed by one or more processors (not shown) and one or more memory architectures (not shown) incorporated into computer 36. Storage device 42 may be, for example, a hard disk drive, a tape drive, an optical drive, a RAID array, a random access memory (RAM), or a read-only memory (ROM).

Users 14, 16, 18, 20, 22, 24 may access data compilation system 10 directly through network 38 or through secondary network 40. Further, computer 36 (i.e., the computer that executes data compilation system 10) may be connected to network 38 through secondary network 40, as illustrated with phantom link line 44.

Users 14, 16, 18, 20, 22, 24 typically access data compilation system 10 through a client device 46 (e.g., a client computer, a personal digital assistant, a cellular telephone, a television, a cable box, an internet radio, or a dedicated internet device) that is connected to network 38 (or network 40) and executes a client application 48 (e.g., Microsoft Internet Explorer™, Netscape Navigator™, RealRhapsody™, RealPlayer™, or a specialized interface). Client device 46 may run an operating system, such as Microsoft Windows™, or Redhat Linux™, for example. Client device 46 may be hardwired to network 38 (or network 40) or wirelessly-coupled to network 38 (or network 40). For example, client device 46 may include an Ethernet port (not shown) that allows client device 46 to be hardwired to network 38 (or network 40) via a twisted-pair network cable (not shown). Further, client device 46 may be indirectly hardwired to network 38 (or network 40) via an intermediary computer (not shown) coupled to network 38 (or network 40). For example, the intermediary computer (not shown) may be hardwired to network 38 (or network 40) via a twisted-pair network cable (not shown). Client device 46 may then be hardwired to the intermediary computer (not shown) via a Universal Serial Bus (i.e., USB) port or a Firewire™ (i.e., IEEE 1394) port. If wirelessly coupled to network 38 (or network 40), a wireless access point (not shown) may be used to wirelessly couple client device 46 to network 38 (or network 40) via e.g., an 802.11a, 802.11b or 802.1 µg wireless communication channel.

The instruction sets and subroutines of client application 48, which are typically stored on a storage device 50 coupled to client device 46, are executed by one or more processors (not shown) and one or more memory architectures (not shown) incorporated into client device 46. Storage device 50 may be, for example, a hard disk drive, a tape drive, an optical drive, a RAID array, a random access memory (RAM), or a read-only memory (ROM).

An administrator 52 typically accesses and administers data compilation system 10 through a desktop application 54 (e.g., Microsoft Internet Explorer™, Netscape Navigator™, or a specialized interface) running on an administrative computer 56 that is also connected to the network 38 (or network 40).

Media distribution service 26 distributes media to users 12, 14, 16, 18, 20, 22, 24, such that the media distributed may be in the form of file downloads or streams. Examples of the types of media distributed by media distribution service 10 include: audio files (e.g., music files, audio news broadcasts, and audio sports broadcasts, for example); video files (e.g., video footage that does not include sound, for example); audio/video files (e.g., a/v news broadcasts, a/v sports broadcasts, movies and movie clips, and music videos, for example); and multimedia content (e.g., interactive presentations and slideshows, for example).

For example, if media distribution service 26 is a music distribution service, user 12 may be allowed to download music files (e.g., MP3 files), such that copies of the music files are transferred from computer 36 to client device 46. Alternatively, media distribution service 26 may only allow user 12 to receive a stream of a data files. As discussed above, when a file is streamed from e.g., computer 36 to client device 46, a copy of the file is not retrained on client device 46. Additionally, media distribution service 26 may allow user 12 to stream files and download them. An example of such a media distribution service is the Rhapsody™ service offered by RealNetworks™, Seattle, Wash.

As discussed above, when using a media distribution service, the service usually provides summaries (e.g., tables) that define the consolidated preferences of all the users of the media distribution service. For example, if media distribution service 26 streams music to 1,000,000 users, summaries may be available to the users that summarizes e.g., the top 100 tracks streamed (to the 1,000,000 users), the top 100 artists streamed (to the 1,000,000 users), and the top 100 titles streamed (to the 1,000,000 users).

Figure 2:
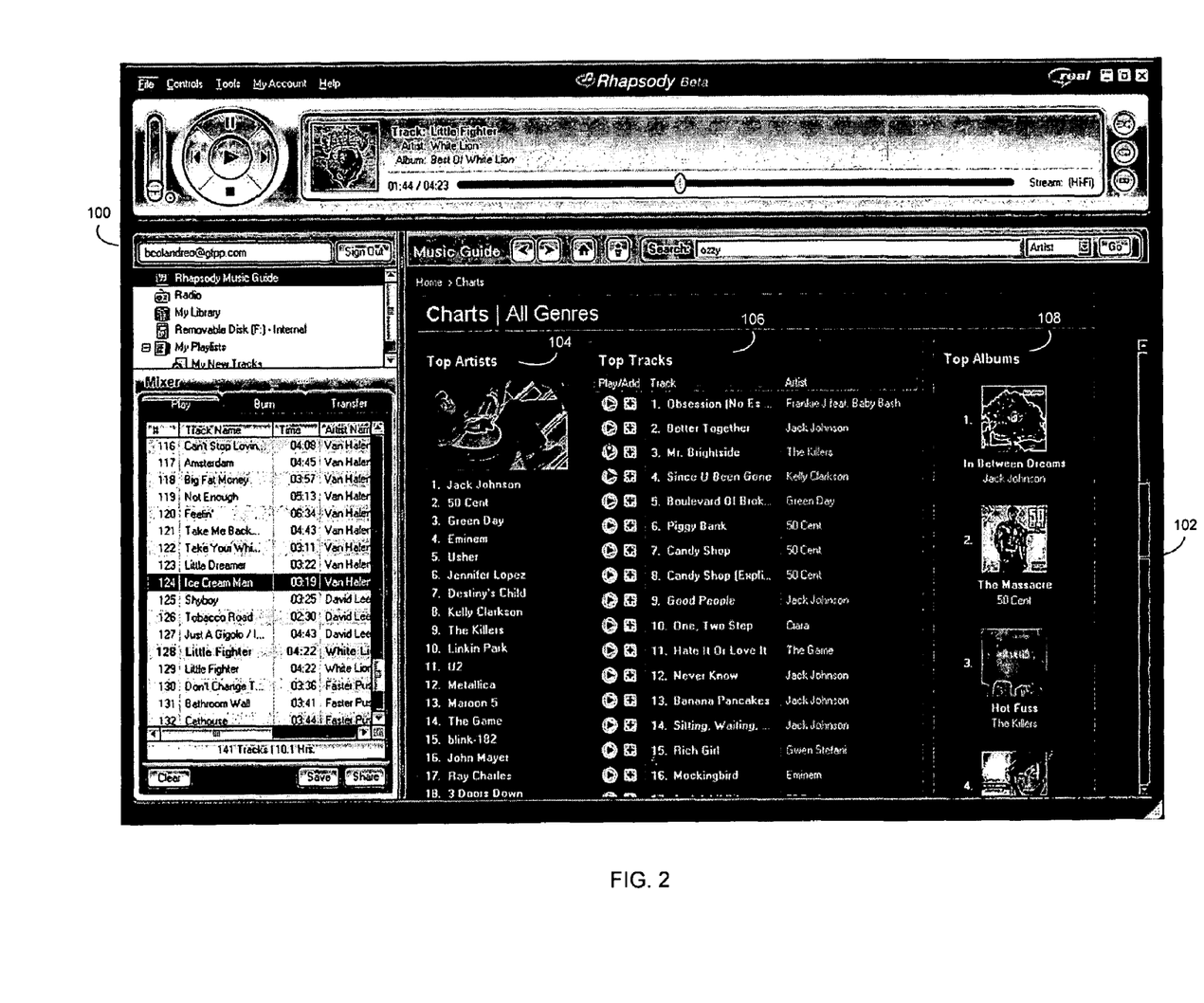
FIG. 2 is a display screen rendered by the media distribution service of FIG. 1.

Accordingly and referring also to FIG. 2, upon accessing media distribution service 26 with client application 48, user 10 may be presented with a welcome display screen 100 that summarizes the consolidated preferences of the users of media distribution service 26. Client application 48 typically includes a user interface 102 (e.g., a web browser) for interfacing with media distribution service 10 and viewing welcome display screen 100. Welcome display screen 100 may include e.g., three columns 104, 106, 108 that define the top artists, top tracks, and top albums respectively. As discussed above, columns 104, 106, 108 define the consolidated preferences of all of the users of media distribution service 26. Accordingly, these consolidated preferences are based upon the likes and opinions of many diverse groups of people, such as rock and roll fans, heavy metal fans, classical fans, hip-hop fans, and rap fans, for example.

Figure 3:
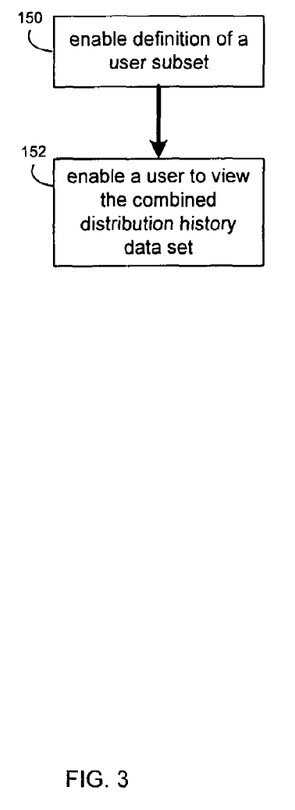
FIG. 3 is a flow chart of a client process executed by a client coupled to the distributed computing network of FIG. 1.

Referring also to FIG. 3, client application 48 interfaces with data compilation system 10 and enable 150 a user (e.g., user 12) to define a user subset (i.e., a group of friends/buddies) that includes at least one member, such that the members of the user subset are chosen from the users of media distribution service 26. This user subset may only include a single member (e.g., user 12) or may include many members. This user subset is similar to a "buddy list" used by many "instant messenger" services.

Figure 4:
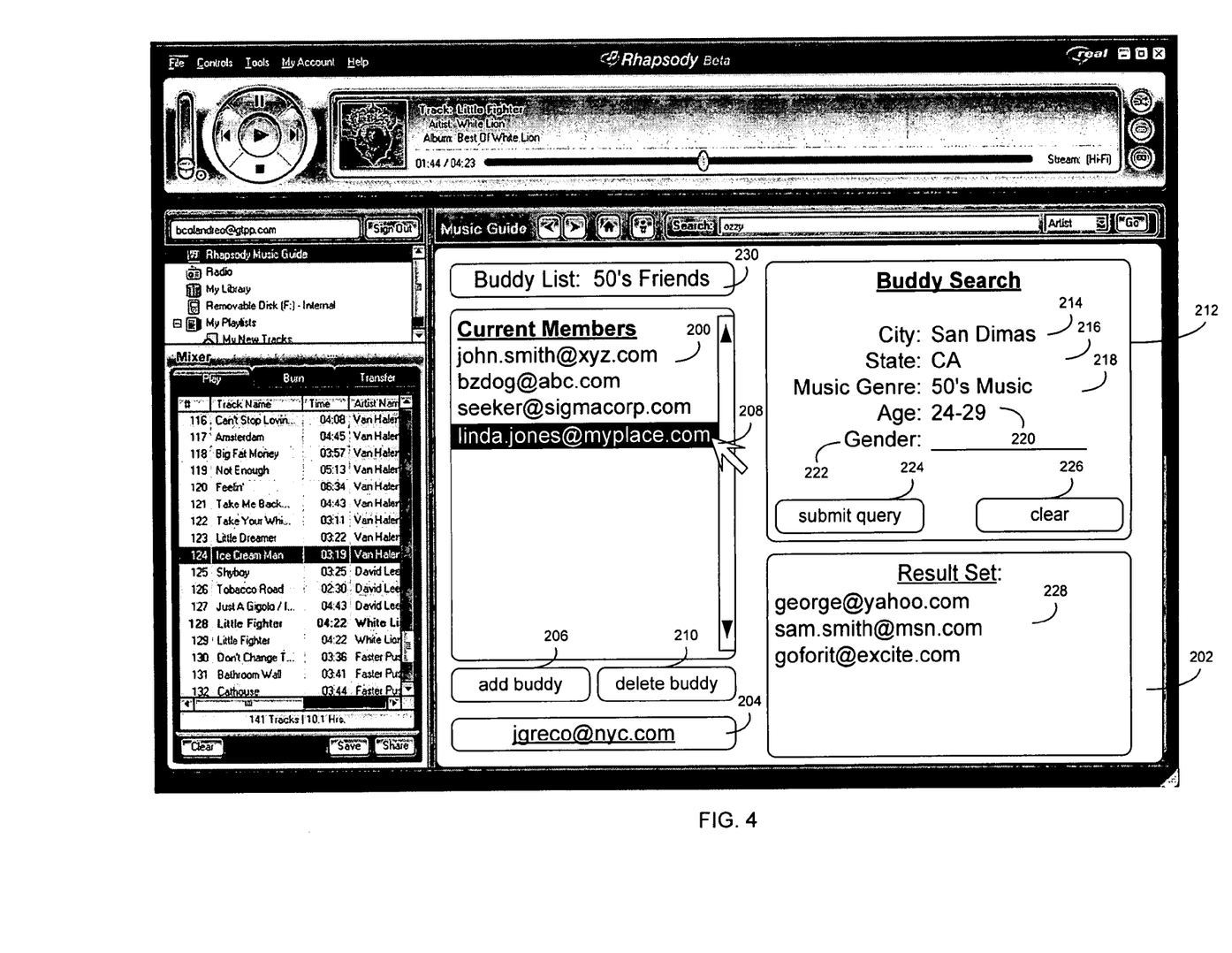
FIG. 4 is a display screen rendered by the data compilation system of FIG. 1.

Referring also to FIG. 4, user 12 may use client application 48 to define user subset 200 via user interface 102. Typically, web page 202 is served by computer 36 and viewable via user interface 102, such that web page 202 includes functionality that allows user 12 to define user subset 200. For example, web page 200 may include a user identification field 204 that allows user 12 to define a new member of user subset 200. In this particular example, user "jgreco@nyc.com" will be added to user subset 200 upon user 12 selecting the "add buddy" button 206 (via a screen pointer 208 that is controllable by a pointing device such as a computer mouse, not shown), resulting in the required commands being provided to data compilation system 10 (via network 38) to add "jgreco@nyc.com" to user subset 200. Additionally, web page 202 may include a "delete buddy" button 210 that allows user 12 to delete members from user subset 200. For example, if user 12 wished to remove "lindajones@myplace.com" from user subset 200, user 12 may select "lindajones@myplace.com" from user subset 200 using screen pointer 208 and select the "delete buddy" button 210, resulting in the required commands being provided to data compilation system 10 (via network 38) to delete "lindajones@myplace.com" from user subset 200.

Web page 202 may additionally include functionality that allows user 12 to search for users of media distribution service 26. For example, a query screen 212 may be included that defines a plurality of fields 214, 216, 218, 220, 222 (e.g., city, state, music genre, age and gender, for example). Accordingly, if user 12 lives in San Dimas, Calif. and was a fan of 50's music, user 12 may wish to search media distribution service 26 to determine which (if any) of its' users e.g., live in San Dimas, Calif., are fans of 50's music, and are within the age range of 24-29.

In order to execute this query, user 12 (via screen pointer 208) would select the "submit query" button 224, which will submit the query commands to data compilation system 10 for processing. Alternatively, user 12 may clear all fields of query screen 212 by selecting the "clear" button 226 using screen pointer 208. Once the query is processed by data compilation system 10, a result set 228 is generated. Members of this result set may be added to user subset 200. For example, if user 12 wished to add "george@yahoo.com" to user subset 200, user 12 may select "george@yahoo.com" using screen pointer 208 and then select the "add buddy" button 206.

User 12 may additionally assign a name to user subset 200. In this example, user 12 named user subset 200 "50's Friends", which is displayed in the user subset title field 230.

As stated above, user 12 uses client application 48 to define user subset 200. This, in turn, results in the generation of commands that e.g., add members to user subset 200, remove members from user subset 200 and/or execute queries, for example. These commands are provided to data compilation system 10.

Figure 5:
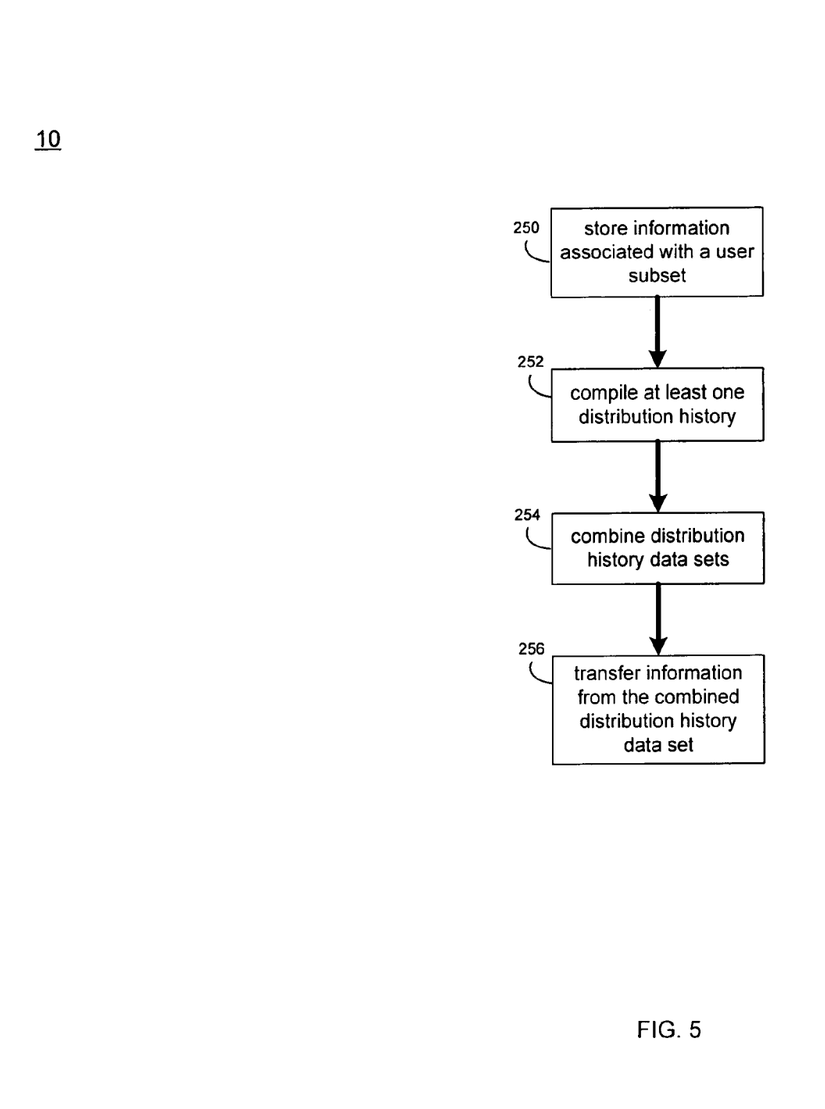
FIG. 5 is a flow chart of a server process executed by the data compilation system of FIG. 1.

Referring also to FIG. 5, data compilation system 10 receives commands from client application 48 (which defines e.g., members to be added to user subset 200, members to be deleted from user subset 200, and queries to be executed by data compilation system 10).

Accordingly, data compilation system 10 processes these commands to define the user subset. Information concerning this user subset is typically stored 250 on a memory storage device (e.g., storage device 42 of computer 36 or storage device 50 of client device 46, for example). As discussed above, in this particular example, user 12 define a user subset named "50's Friends" that includes four members, namely: john.smith@xyz.com; bzdog@abc.com; seeker@sigmacorp.com; lindajones@myplace.com; and jgreco@nyc.com.

Data compilation system 10 compiles 252 at least one distribution history data set for each member of user subset 200. In order to compile a distribution history data set for a particular member, the downloading/streaming habits of that member are monitored by data compilation system 10.

For example and as discussed above, data compilation system 10 may monitor: the top ten artists downloaded/streamed by the member; the top ten tracks downloaded/streamed by the member; and/or the top ten albums downloaded/streamed by the member. This top artist information, top track information, and top album information is typically stored on a memory storage device (e.g., storage device 42 of computer 36 or storage device 50 of client device 46, for example).

Typically, the monitoring, processing, and storing of the top artist information, top track information, and top album information is performed by e.g., computer 36. However, data compilation system 10 may be configured such that the monitoring, processing, and storing of the top artist, track, and album information is performed by e.g., client device 46, for example.

Depending on how data compilation system 10 is configured by administrator 52, data compilation system 10 may perform proactive or reactive monitoring of a member's downloading/streaming habits. For example, data compilation system 10 may be configured to monitor the downloading/streaming habits of all of the users of media distribution service 26 (e.g., users 12, 14, 16, 18, 20, 22, 24), regardless of whether or not they are a member of a user subset. Alternatively, data compilation system 10 may only monitor a user's downloading/streaming habits once they become a member of a user subset.

When compiling the distribution history data sets, data compilation system 10 may simply sum the number of times that each artist, track and/or album was downloaded/streamed, and rank each in accordance with that sum. Alternatively, more complex algorithms may be used that e.g., weight summations in accordance with the amount of time since the last download/stream, and/or monitor the proximity of individual downloads/streams.

Figure 6:
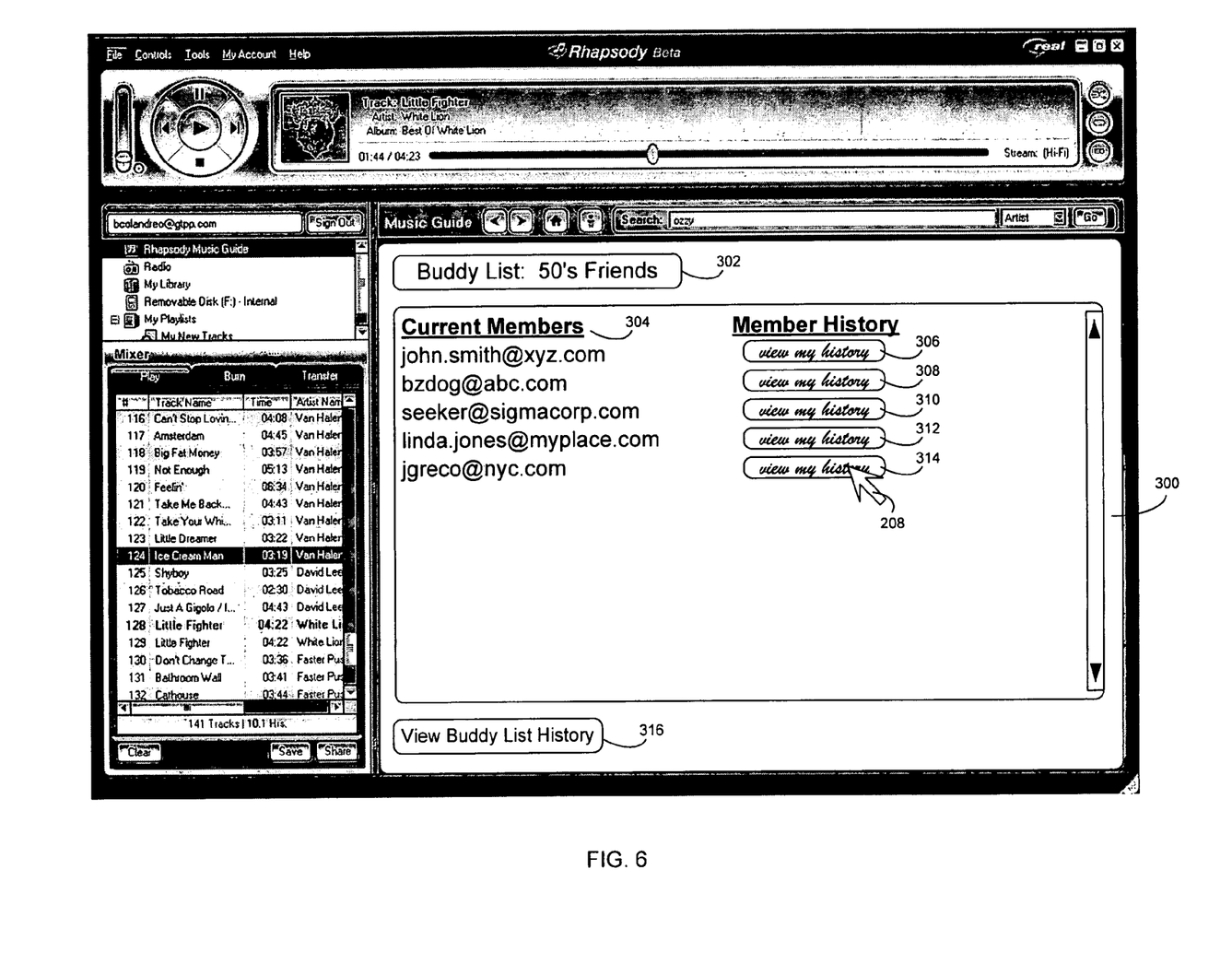
FIG. 6 is a display screen rendered by the data compilation system of FIG. 1.

Referring also to FIG. 6, once a user subset is defined, user 12 may access a user subset webpage 300 (served by computer 36) that e.g., specifies the name 302 of the user subset and itemizes its members 304. Webpage 300 is typically viewable via user interface 102 incorporated into client application 48. Additionally, webpage 300 typically includes a history link 306, 308, 310, 312, 314 that provides e.g., a hyperlink to a distribution history data set for each member of the user subset. Accordingly, if user 12 wished to see the distribution history subset for "jgreco@nyc.com", user 12 may select (using screen pointer 208) history link 314 (i.e., the link corresponding to "jgreco@nyc.com").

Figure 7:
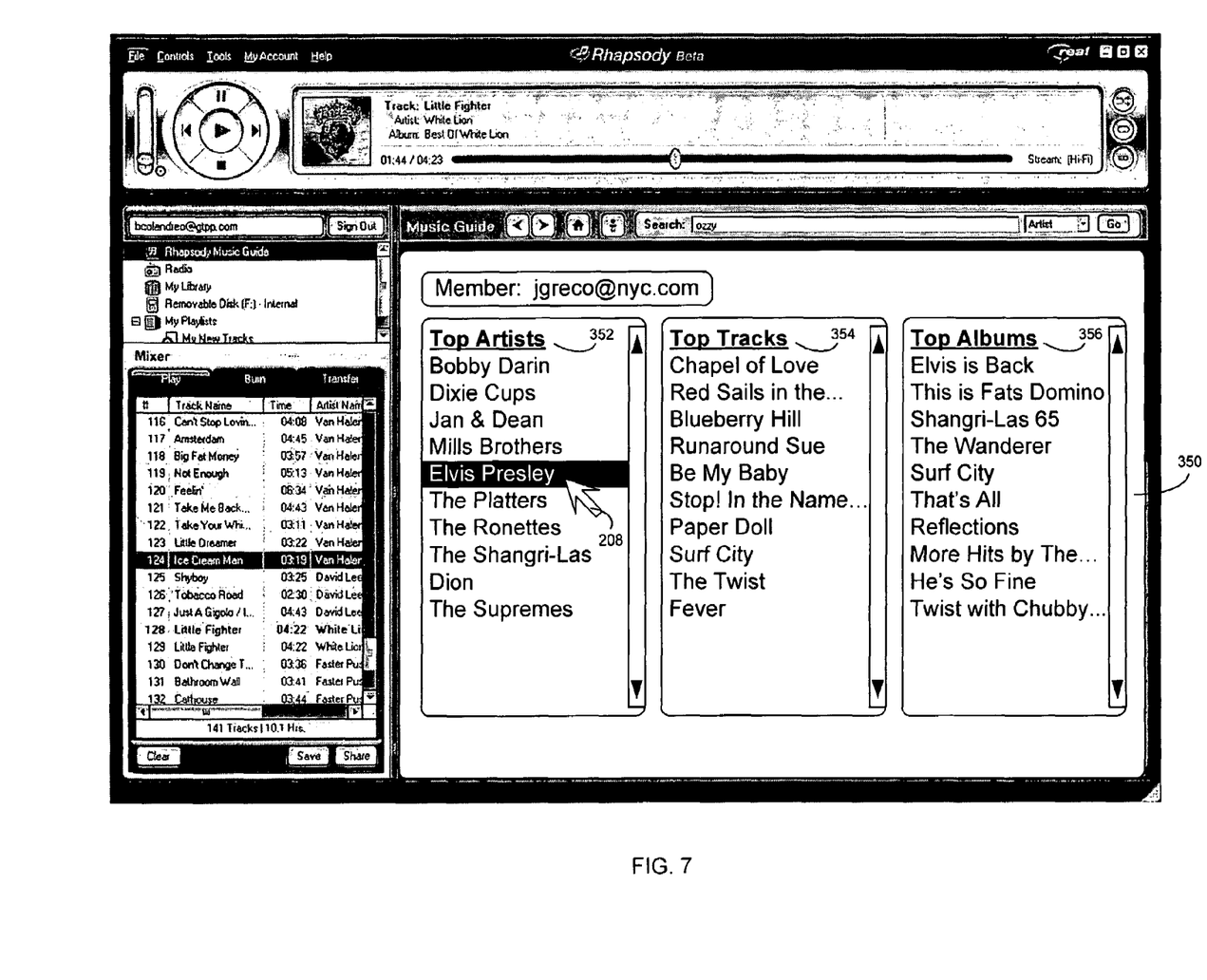
FIG. 7 is a display screen rendered by the data compilation system of FIG. 1.

Referring also to FIG. 7, once history link 314 is selected, user 12 is presented with member webpage 350 (served by computer 36), which summarizes the distribution history data set(s) for member "jgreco@nyc.com". Webpage 300 is typically viewable via user interface 102 incorporated into client application 48. Specifically, webpage 350 illustrates three distribution history data sets (i.e., the top ten artists 352 downloaded/streamed by "jgreco@nyc.com"; the top ten tracks 354 downloaded/streamed by "jgreco@nyc.com"; and/or the top ten albums 356 downloaded/streamed by "jgreco@nyc.com".

Figure 8:
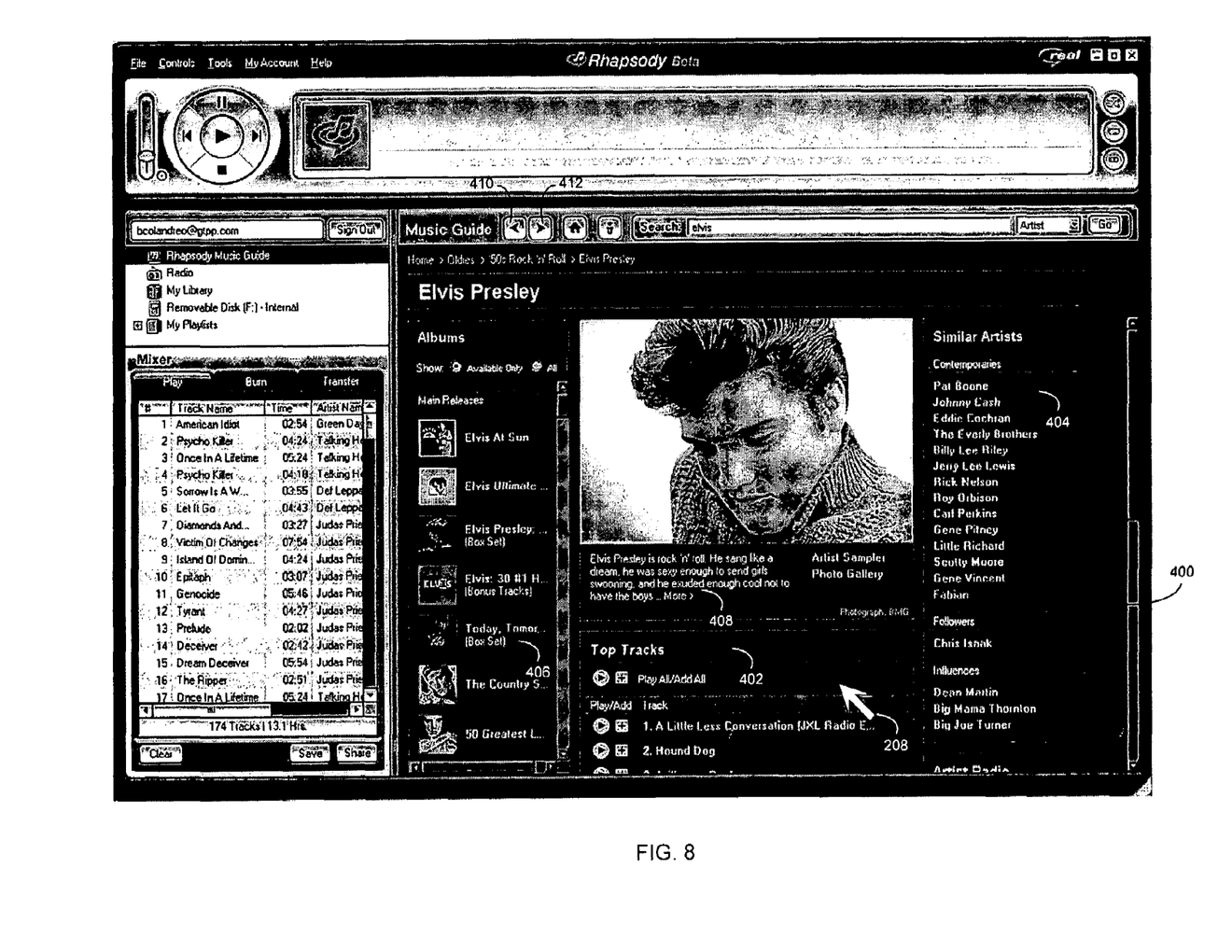
FIG. 8 is a display screen rendered by the data compilation system of FIG. 1.

Typically, each entry within the top ten artists 352 column, the top ten tracks 354 column, and/or the top ten albums 356 column is a hyperlink, such that selecting an entry provides user 12 with additional information concerning that particular artist, track, and/or album. For example and referring also to FIG. 8, if user 12 selects (using screen pointer 208) the entry "Elvis Presley" within the top ten artist column 352, user 12 is directed to a webpage 400 concerning Elvis Presley, which lists e.g., top tracks 402 (i.e., greatest hits), a list of similar artists 404, a list of Elvis Presley albums 406, and information 408 concerning Elvis Presley.

User 12 may use the navigation buttons (i.e., "backwards" button 410 and "forward" button 412) incorporated into user interface 102 to navigate web pages. For example, if user 12 wished to view the previously-displayed webpage (i.e., member webpage 350, FIG. 7), user 12 may select (using screen pointer 208) "backwards" button 410. Accordingly, selecting "backwards" button 410 a second time will return user 12 to user subset webpage 300, FIG. 6.

As discussed above, data compilation system 10 compiles 252 at least one distribution history data set for each member of user subset 200. Referring again to FIG. 5, data compilation system 10 combines 254 the distribution history data sets for each member of the user subset to form a combined distribution history data set for the user subset.

Typically, the process of combining the distribution history data sets for each member of the user subset to form a combined distribution history data set for the user subset is performed by e.g., computer 36. However, data compilation system 10 may be configured such that the process of combining is performed by e.g., client device 46, for example.

When combining the distribution history data sets to form the combined distribution history data set, data compilation system 10 may simply sum the number of times that each artist, track and/or album was downloaded/streamed by all members of the user subset, and rank each in accordance with that sum. Alternatively, more complex algorithms may be used that e.g., weight summations in accordance the amount of time since the last download/stream, and/or monitor the proximity of individual downloads/streams. Once determined by data compilation system 10, information concerning the combined distribution history data set is transferred 256, such that user 12 (or any other user) may access it.

Referring again to FIGS. 3 & 6, while webpage 300 provides history links 306, 308, 310, 312, 314 that provide e.g., a hyperlink to a distribution history data set for each member of the user subset, webpage 300 additionally enables 152 user 12 to view the combined distribution history data set by selecting (with screen pointer 208) the "View Buddy List History" button 316.

Figure 9:
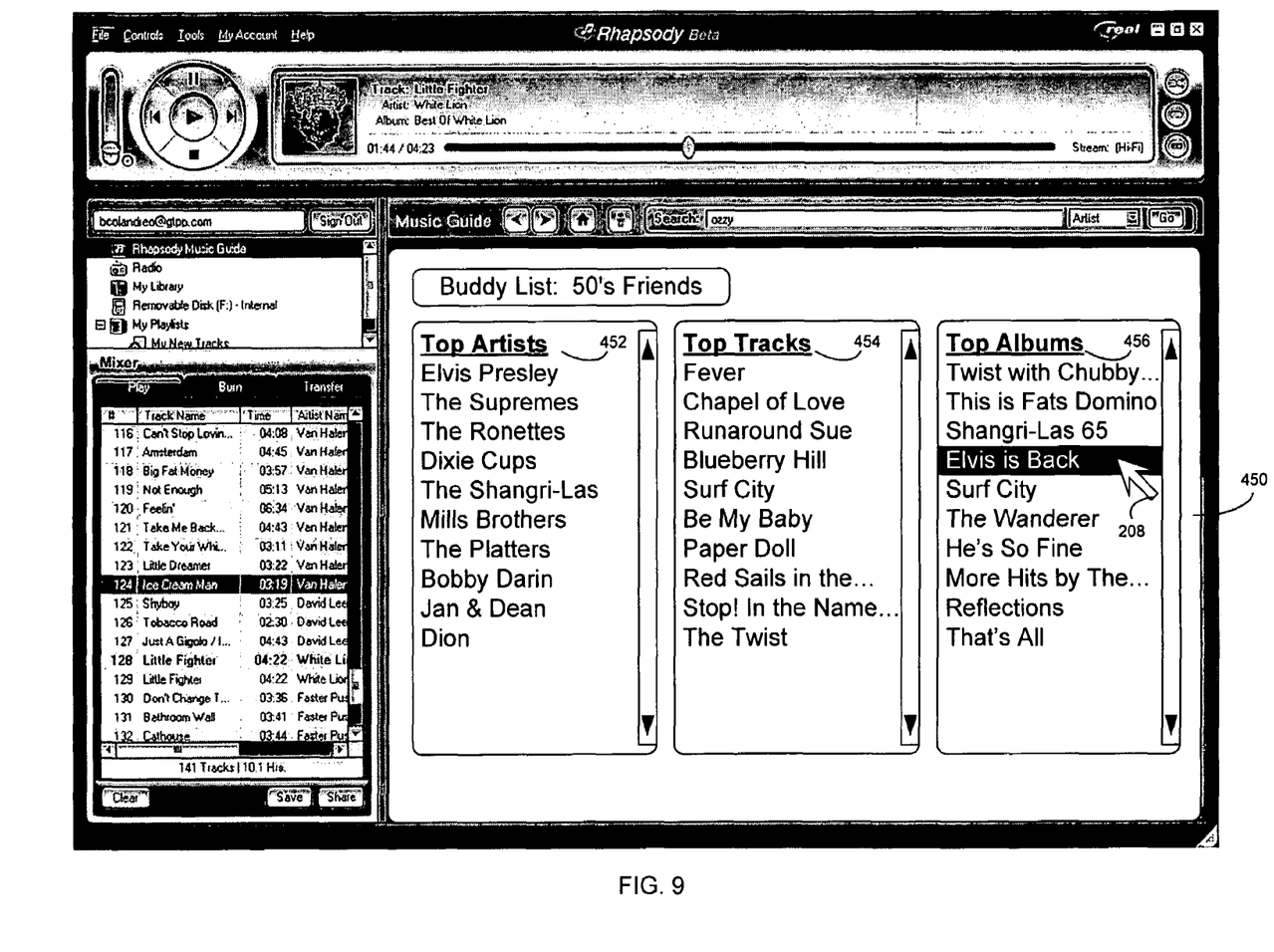
FIG. 9 is a display screen rendered by the data compilation system of FIG. 1.

Referring also to FIG. 9, once button 316 is selected, user 12 is presented with user subset webpage 450 (served by computer 36), which summarizes the combined distribution history data set for all members of the user subset "50's Friends". Webpage 450 is typically viewable via user interface 102 incorporated into client application 48. Webpage 450 illustrates three combined distribution history data sets (i.e., the top ten artists 452 downloaded/streamed by user subset "50's Friends"; the top ten tracks 454 downloaded/streamed by user subset "50's Friends"; and/or the top ten albums 456 downloaded/streamed by user subset "50's Friends". User 12 may view user subset webpage 450 and combined distribution history data set(s) 452, 454, 456 using client application 48 and user interface 102.

Figure 10:
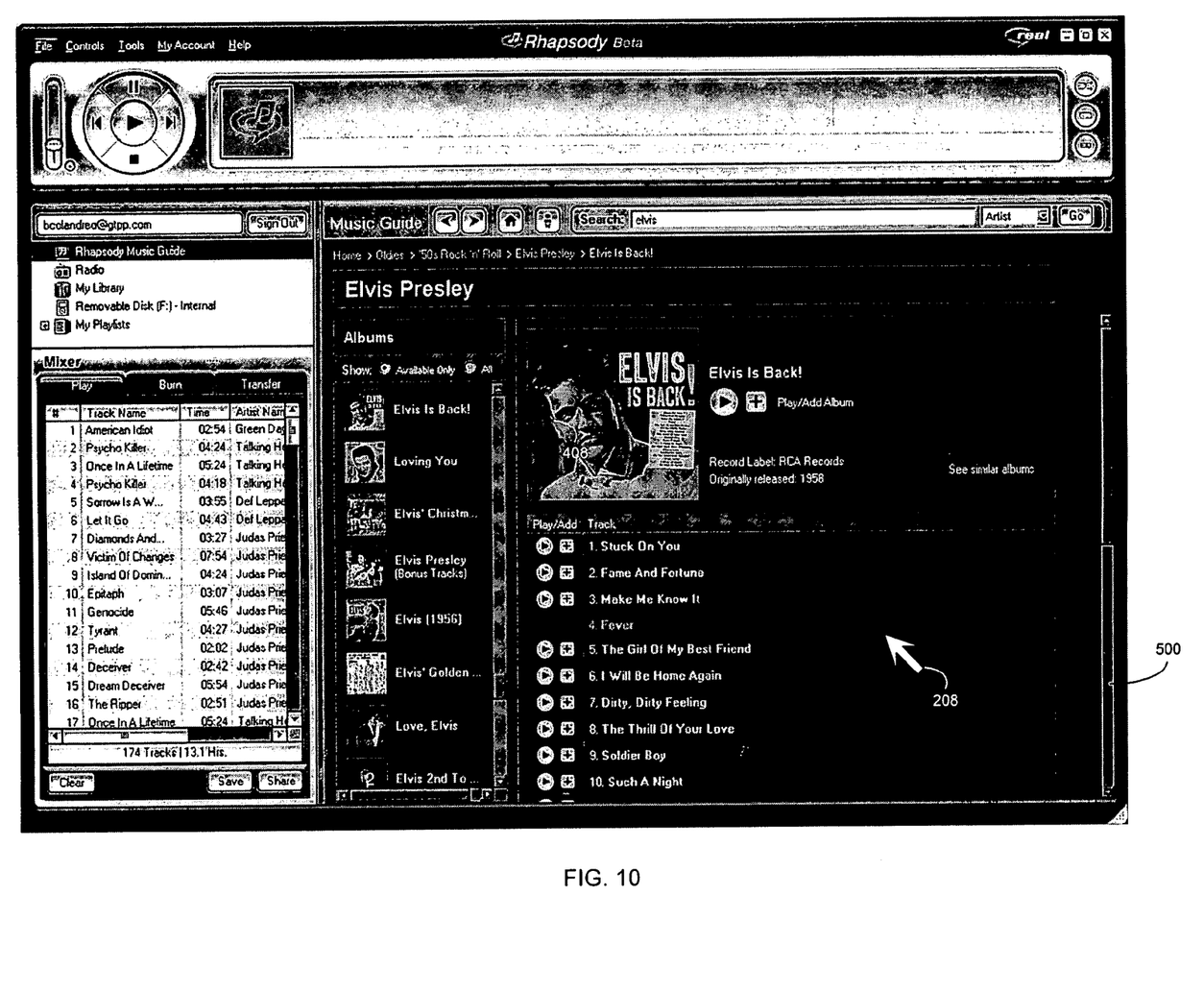
FIG. 10 is a display screen rendered by the data compilation system of FIG. 1.

Typically, each entry within the top ten artists 452 column, the top ten tracks 454 column, and/or the top ten albums 456 column is a hyperlink, such that selecting an entry provides user 12 with additional information concerning that particular artist, track, and/or album. For example and referring also to FIG. 10, if user 12 selects (using screen pointer 208) the entry "Elvis is Back" within the top ten albums 456 column, user 12 is directed to a webpage 500 (served by computer 36) concerning the album "Elvis is Back" by Elvis Presley. Webpage 500 is typically viewable via user interface 102 incorporated into client application 48.

While the system is described above as including distribution history data sets that include the top ten artists, tracks, and albums downloaded/streamed by the user, this is for illustrative purposes only, as other configurations are possible. For example, distribution history data sets may be based on the top one-hundred or one-thousand artists, tracks, and albums downloaded/streamed by the user.

While the system is described above as transferring ranked information (e.g., the top ten artists, tracks, and albums downloaded/streamed by the user), this is for illustrative purposes only, as other configurations are possible. For example, in addition to (or instead of) ranked information, other non-ranked/random information may be presented to the user. Examples of such non-ranked/random information include promotional information, commercial information, and advertisement information concerning various albums/artists/tracks. Accordingly, the record company that produces Elvis Presley compact discs may pay a promotional fee to media distribution service 26 so that a hyperlink to an Elvis Presley compact disc is always presented to the user under the heading of e.g., recommended albums.

A number of implementations have been described. Nevertheless, it will be understood that various modifications may be made. Accordingly, other implementations are within the scope of the following claims.

What is claimed is:

1. A method comprising:
   receiving, at a computing device associated with a media distribution service, a query from a user electronic device, the query representing at least one entry from a first user in at least one of a plurality of fields of a query screen;
   generating at the computing device, in response to the query, a result set including a subset of users of the media distribution service, the subset of users corresponding to the at least one entry;
   storing media preference information associated with each member of the subset of users of the media distribution service in a memory of the computing device, wherein the media preference information comprises a history of media played by each member of the subset of users and a history of media distributed to each member of the subset of users by the media distribution service;
   compiling, at the computing device, at least one distribution history data set for each member of the subset of users that includes the media preference information associated with each of the subset of users;
   combining, at the computing device, the at least one distribution history data set for each member of the subset of users to form a combined distribution history data set;
   generating a combined list of media for the first user based on the combined distribution history data set; and
   transferring information from at least one of the distribution history data set and the combined distribution history data set to the user electronic device, the information in a format editable by the first user, the information including a list including each member of the user subset and the combined list of media.

2. The method of claim 1 wherein storing media preference information includes storing media preference information in a memory of a server device.

3. The method of claim 1 wherein transferring information includes transferring ranked information from the combined distribution history data set.

4. The method of claim 1 wherein transferring information includes transferring random information from the combined distribution history data set.

5. The method of claim 1 wherein storing the media preference information includes at least one of:
   storing top album information associated with the subset of users;
   storing top artist information associated with the subset of users; and
   storing top track information associated with the subset of users.

6. The method of claim 1 wherein transferring information includes at least one of:
   transferring information via a wireless connection;
   transferring information via a wired connection;
   transferring information via a universal serial bus port; and
   transferring information via a firewire port.

7. The method of claim 1 wherein the distribution history data set for each member of the subset of users is compiled by one or more of:
   the computing device, wherein the computing device is a server device; and
   the user electronic device.

8. The method of claim 1 wherein the combined distribution history data set is compiled by one or more of:
   the computing device, wherein the computing device is a server device; and
   the user electronic device.

9. The method of claim 1 wherein the list of media is chosen from the group consisting of:
   a top album data set;
   a top artist data set; and
   a top track data set.

10. The method of claim 1 wherein transferring information includes serving a web page that illustrates the combined distribution history data set.

11. The method of claim 1 wherein the subset of users includes a single member.

12. The method of claim 1 wherein the media preference information includes data representing media requested by each member of the subset of users.

13. A computer readable storage medium storing a computer program for distributing media information, the computer program comprising a plurality of instructions stored thereon which, when executed by a computer, cause the computer to perform the following:
   receive, at a computing device associated with a media distribution service, a query from a user electronic device, the query representing at least one entry from a first user in at least one of a plurality of fields of a query screen;

generate, in response to the query, a result set including a subset of users of the media distribution service, the subset of users corresponding to the at least one entry;

store media preference information associated with each member of the subset of users of the media distribution service in a memory, wherein the media preference information comprises a history of media played by each member of the subset of users and a history of media distributed to each member of the subset of users by the media distribution service;

compile, at the computing device, at least one distribution history data set for each member of the subset of users that includes the media preference information associated with each member of the subset of users;

combine, at the computing device, the at least one distribution history data set for each member of the subset of users to form a combined distribution history data set;

generate a combined list of media for the first user based on the combined distribution history data set; and transfer information from at least one of the distribution history data set and the combined distribution history data set to the user electronic device, the information in a format editable by the first user, the information including at least one of a list including each member of the user subset and the combined list of media.

14. The computer readable storage medium of claim 13 wherein the computer readable medium and the processor are included within a server device.

15. The computer readable storage medium of claim 13 wherein the instructions for storing media preference information include instructions for storing media preference information in a memory of a server computer.

16. The computer readable storage medium of claim 13 wherein the instructions for transferring information include instructions for transferring ranked information from the combined distribution history data set.

17. The computer readable storage medium of claim 13 wherein the instructions for transferring information include instructions for transferring random information from the combined distribution history data set.

18. The computer readable storage medium of claim 13 wherein the instructions for storing media preference information include instructions for at least one of:
storing top album information associated with each member of the subset of users;
storing top artist information associated with each member of the subset of users; and
storing top track information associated with each member of the subset of users.

19. The computer readable storage medium of claim 13 wherein the instructions for transferring information include instructions for at least one of:
transferring information via a wireless connection;
transferring information via a wired connection;
transferring information via a universal serial bus port; and
transferring information via a firewire port.

20. The computer readable storage medium of claim 13 wherein the distribution history data set for each member of the subset of users is compiled by one or more of:
a server device; and
the user electronic device.

21. The computer readable storage medium of claim 13 wherein the combined distribution history data set is compiled by one or more of:
a server device; and
the user electronic device.

22. The computer readable storage medium of claim 13 wherein the list of media is chosen from the group consisting of:
a top album data set;
a top artist data set; and
a top track data set.

23. The computer readable storage medium of claim 13 wherein the instructions for transferring information include instructions for: serving a web page that illustrates the combined distribution history data set.

24. The computer readable storage medium of claim 13 wherein the subset of users includes a single member.

25. The computer readable storage medium of claim 13 wherein the media preference information includes data representing media requested by each member of the subset of users.

26. A client computing device, configured to receive media distributed from a server computing device, the client computing device further configured to perform operations comprising:
enabling a user to define a subset of users having at least one member, the at least one member being chosen from a plurality of users of a media distribution service;
sending a query from a user electronic device, the query representing at least one entry from the user in at least one of a plurality of fields of a query screen, to the server computing device;
receiving a list of the subset of users and a list of media from the server computing device that includes information from a combined distribution history data set of the subset of users; and
enabling a user to view and edit the combined distribution history data set and a list of the subset of users, wherein the combined distribution history data set is a combination of at least one distribution history data set for each member of the subset of users, wherein the at least one distribution history data set for each member includes media played by the member and media distributed to the member by the media distribution service.

27. The client computing device of claim 26 further comprising: a user interface configured for allowing a user to access the combined distribution history data set.

28. The client computing device of claim 26 wherein the client computing device is chosen from the group consisting of:
a client-side application,
a client computer,
a personal digital assistant,
a cellular telephone,
a television,
a cable box,
an internet radio, and
a dedicated internet device.

29. The client computing device of claim 26 wherein the list of media is chosen from the group consisting of:
a top album data set;
a top artist data set; and
a top track data set.

30. The client computing device of claim 26 wherein the media distributed by the server computing device is chosen from the group consisting of:
audio media,
video media; and
audio/video media.

31. A computer readable storage medium storing a computer program for distributing media information, the computer program comprising a plurality of instructions, when executed by a computer, cause the computer to perform the following:

receive, at a computing device associated with a media distribution service, a query from a user electronic device, the query representing at least one entry from a first user in at least one of a plurality of fields of a query screen;

generate at the computing device, in response to the query, a result set including a subset of users of the media distribution service, the subset of users corresponding to the at least one entry;

store media preference information associated with each member of the subset of users in a memory, wherein the media preference information comprises a history of media played by each member of the subset of users and a history of media distributed to each member of the subset of users by the media distribution service;

compile, at the computing device, at least one distribution history data set for each of the subset of users that includes the media preference information associated with each of the members of the subset of users;

combine, at the computing device, the at least one distribution history data set for each member of the subset of users to form a combined distribution history data set;

generate a combined list of media for the first user based on the combined distribution history data set; and transfer information from at least one of the distribution history data set and the combined distribution history data set to the user electronic device, the information in a format editable by the first user, the information including at least one of a list including each member of the user subset and the combined list of media.

32. The computer readable storage medium of claim 31 wherein storing media preference information includes storing media preference information in a memory of the server computing device.

33. The computer readable storage medium of claim 31 wherein transferring information includes transferring ranked information from the combined distribution history data set.

34. The computer readable storage medium of claim 31 wherein transferring information includes transferring random information from the combined distribution history data set.

35. The computer readable storage medium of claim 31 wherein storing media preference information includes at least one of:
   storing top album information associated with the subset of users;
   storing top artist information associated with the subset of users; and
   storing top track information associated with the subset of users.

36. The computer readable storage medium of claim 31 wherein transferring information includes at least one of:
   transferring information via a wireless connection;
   transferring information via a wired connection;
   transferring information via a universal serial bus port; and
   transferring information via a firewire port.

37. The computer readable storage medium of claim 31 wherein the distribution history data set for each member of the subset of users is compiled by one or more of:
   the server computing device; and
   the user electronic device.

38. The computer readable storage medium of claim 31 wherein the combined distribution history data set is compiled by one or more of:
   the server computing device; and
   the user electronic device.

39. The computer readable storage medium of claim 31 wherein the list of media is chosen from the group consisting of:
   a top album data set;
   a top artist data set; and
   a top track data set.

40. The computer readable storage medium of claim 31 wherein the media distributed by the server device is chosen from the group consisting of:
   audio media,
   video media; and
   audio/video media.

41. The computer readable storage medium of claim 31 wherein transferring information includes: serving a web page that illustrates the combined distribution history data set.

42. The computer readable storage medium of claim 31 wherein the media preference information includes data representing media requested by each member of the subset of users.

43. A method comprising:

receiving, at a computing device associated with a media distribution service, a query from a user electronic device, the query representing at least one entry from a first user in at least one of a plurality of fields of a query screen;

generating at the computing device, in response to the query, a result set including a subset of users of the media distribution service, the subset of users corresponding to the at least one entry;

storing media preference information associated with each member of the subset of users of the media distribution service in a memory of the computing device, wherein the media preference information comprises a history of media played by each member of the subset of users and a history of media distributed to each member of the subset of users by the media distribution service;

compiling, at the computing device, at least one distribution history data set for each member of the subset of users that includes the media preference information associated with each of the subset of users;

combining, at the computing device, the at least one distribution history data set for each member of the subset of users to form a combined distribution history data set;

generating a list of the subset of users based on the at least one entry that includes information from the combined distribution history data set; and transferring information from at least one of the distribution history data set and the combined distribution history data set to the user electronic device, the information in a format editable by the first user.

44. The method of claim 43 further comprising receiving data representing the first user's assigned name for each member of the subset of users and associating such name with each member of the subset of users.

45. The method of claim 43 further comprising receiving data representing the first user's instruction to add or remove members from the subset of users.

46. The method of claim 43 wherein the the at least one entry comprises at least one of a name or identifier, a genre, an age or age range, a gender, an address or geographic location, and an email address.

* * * * *

UNITED STATES PATENT AND TRADEMARK OFFICE
CERTIFICATE OF CORRECTION

PATENT NO.       : 7,617,296 B2                                    Page 1 of 1
APPLICATION NO.  : 11/112021
DATED            : November 10, 2009
INVENTOR(S)      : Bryna L. Bank It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1052 days.

Signed and Sealed this

Nineteenth Day of October, 2010

David J. Kappos
*Director of the United States Patent and Trademark Office*